(12) United States Patent
Kim et al.

(10) Patent No.: US 8,531,975 B2
(45) Date of Patent: Sep. 10, 2013

(54) METHOD AND APPARATUS FOR CONTROLLING UPLINK POWER IN A WIRELESS COMMUNICATION SYSTEM

(75) Inventors: Dong Cheol Kim, Anyang-si (KR); Min Seok Noh, Anyang-si (KR); Yeong Hyeon Kwon, Anyang-si (KR); Jin Sam Kwak, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 12/996,007

(22) PCT Filed: Jul. 8, 2009

(86) PCT No.: PCT/KR2009/003738
§ 371 (c)(1),
(2), (4) Date: Dec. 2, 2010

(87) PCT Pub. No.: WO2010/005237
PCT Pub. Date: Jan. 14, 2010

(65) Prior Publication Data
US 2011/0134759 A1 Jun. 9, 2011

Related U.S. Application Data

(60) Provisional application No. 61/078,790, filed on Jul. 8, 2008.

(51) Int. Cl.
*H04L 12/26* (2006.01)

(52) U.S. Cl.
USPC .......................................... 370/242; 370/311

(58) Field of Classification Search
USPC ................................... 370/242, 311; 455/522
See application file for complete search history.

(56) References Cited

U.S. PATENT DOCUMENTS

| | | | |
|---|---|---|---|
| 7,917,164 B2 * | 3/2011 | Rao | 455/522 |
| 2006/0003787 A1 | 1/2006 | Heo et al. | |
| 2006/0046789 A1 | 3/2006 | Huh et al. | |
| 2006/0111119 A1 | 5/2006 | Iochi | |

(Continued)

FOREIGN PATENT DOCUMENTS

| | | |
|---|---|---|
| CN | 101137236 | 3/2008 |
| WO | 2007-129941 A1 | 11/2007 |
| WO | 2007-149616 A1 | 12/2007 |

OTHER PUBLICATIONS

United States Patent and Trademark Office Application U.S. Appl. No. 13/002,648, Notice of Allowance dated Nov. 14, 2012, 12 pages.

(Continued)

*Primary Examiner* — Chi Pham
*Assistant Examiner* — Fahmida Chowdhury
(74) *Attorney, Agent, or Firm* — Lee, Hong, Degerman, Kang & Waimey

(57) ABSTRACT

A method and apparatus for uplink power control performed by a mobile station (MS) in a wireless communication system is provided. The method includes dividing a frequency band for uplink transmission into a plurality of frequency partitions, obtaining a path loss weight for each of the plurality of frequency partitions, and determining transmit power for each of the frequency partitions on the basis of the path loss weight. Overall system performance can be improved.

5 Claims, 14 Drawing Sheets

(56) References Cited

U.S. PATENT DOCUMENTS

| | | | |
|---|---|---|---|
| 2006/0209767 A1* | 9/2006 | Chae et al. | 370/335 |
| 2006/0268789 A1 | 11/2006 | Yu et al. | |
| 2007/0081449 A1 | 4/2007 | Khan | |
| 2007/0082620 A1* | 4/2007 | Zhang et al. | 455/69 |
| 2007/0127359 A1 | 6/2007 | Ahn et al. | |
| 2007/0178930 A1* | 8/2007 | Xiao et al. | 455/522 |
| 2007/0275727 A1 | 11/2007 | Lee et al. | |
| 2007/0293260 A1* | 12/2007 | Xiao et al. | 455/522 |
| 2008/0013476 A1 | 1/2008 | Vasudevan | |
| 2008/0057996 A1 | 3/2008 | Sung et al. | |
| 2008/0081655 A1 | 4/2008 | Shin et al. | |
| 2008/0123520 A1* | 5/2008 | Ji et al. | 370/216 |
| 2009/0047958 A1 | 2/2009 | Rimhagen et al. | |
| 2009/0061778 A1 | 3/2009 | Vrzic et al. | |
| 2009/0197588 A1* | 8/2009 | Khandekar et al. | 455/422.1 |
| 2009/0315779 A1 | 12/2009 | Chin et al. | |
| 2010/0105406 A1 | 4/2010 | Luo et al. | |
| 2012/0028673 A1 | 2/2012 | Jeong | |
| 2012/0115535 A1 | 5/2012 | Jeong et al. | |

OTHER PUBLICATIONS

United States Patent and Trademark Office Application U.S. Appl. No. 12/996,974, Office Action dated Oct. 30, 2012, 17 pages.

IEEE 802.16 REV2/D2 Standard, "Air Interface for Broadband Wireless Access Systems", DRAFT standard for Local and metropolitan area networks, Dec. 2007, 2 pages.

United States Patent and Trademark Office Application U.S. Appl. No. 13/002,649, Office Action dated Nov. 23, 2012, 20 pages.

United States Patent and Trademark Office Application U.S. Appl. No. 13/002,649, Final Office Action dated Mar. 28, 2013, 24 pages.

United States Patent and Trademark Office Application U.S. Appl. No. 12/996,974, Office Action dated Mar. 5, 2013, 14 pages.

LG Electronics, "Uplink Power Control Design—Considerations and Mechanism," IEEE 802.16 Broadband Wireless Access Working Group, IEEE C802.16m-08/813, Jul. 2008, 13 pages.

The State Intellectual Property Office of the People's Republic of China Application Serial No. 200980126618.X, Office Action dated Mar. 5, 2013, 6 pages.

\* cited by examiner dat# METHOD AND APPARATUS FOR CONTROLLING UPLINK POWER IN A WIRELESS COMMUNICATION SYSTEM This application is the National Stage filing under 35 U.S.C. §371 of International Application No. PCT/KR2009/003738, filed on Jul. 8, 2009, which claims the benefit of U.S. Provisional Application Ser. No. 61/078,790, filed on Jul. 8, 2008, the contents of which are all incorporated by reference herein in their entireties.

TECHNICAL FIELD

The present invention relates to wireless communications, and more particularly, to a method and apparatus for controlling uplink power in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and a multi-path, an inter-symbol interference (ISI), a Doppler effect caused by mobility of a mobile station (MS), etc. Therefore, various techniques have been developed to overcome the abnormal characteristic of the wireless channel and to increase reliability of wireless communication.

Meanwhile, the wireless communication system is a cellular system. The cellular system provides a communication service by dividing a service area into a plurality of cells to overcome a restriction of the service area and a limitation of capability for accommodating users. However, users located in a cell edge experience inter-cell interference (ICI) due to an interference signal from a neighbor cell. A base station (BS) also experiences the ICI due to the interference signal from the neighbor cell. The ICI is a primary cause of restricting performance of the wireless communication system. The ICI may result in depletion of transmit (Tx) signals and receive (Rx) signals of the users located in the cell edge, decrease in performance, waste of Tx power, etc. This causes a problem in terms of supporting of various services for the users located in the cell edge, maintaining of quality of service (QoS), and cell coverage. Therefore, the next-generation wireless communication system requires to solve the ICI problem and to improve system performance.

A fractional frequency reuse (FFR) scheme is used as one of methods for solving the ICI problem. The FFR scheme divides a full frequency band into a plurality of frequency partitions (FPs), and allocates the FPs to respective cells. According to the FFR scheme, different FPs can be allocated between neighbor cells, and the same FP can be allocated between cells spaced apart from each another. Therefore, ICI can be reduced, and performance of an MS located in a cell edge can be increased.

A method of controlling uplink power is another method for solving the ICI problem. The power control method regulates Tx power so that an uplink signal can be transmitted with the lowest power level while maintaining QoS of the wireless communication system to some extent. MSs located near a cell edge in the cellular system are significantly affected by a path loss, the ICI, etc. The MS has to transmit an uplink signal by determining proper Tx power by avoiding decrease of QoS in association with the path loss while avoiding interference to a neighbor cell.

Accordingly, there is a need for a method of controlling uplink power to effectively regulate ICI when using an FFR scheme.

DISCLOSURE

Technical Problem

The present invention provides a method and apparatus for controlling uplink power in a wireless communication system.

Technical Solution

In an aspect, a method for uplink power control performed by a mobile station (MS) in a wireless communication system is provided. The method include dividing a frequency band for uplink transmission into a plurality of frequency partitions, obtaining a path loss weight for each of the plurality of frequency partitions, and determining transmit power for each of the frequency partitions on the basis of the path loss weight. The transmit power may be determined on the basis of the path loss weight and a path loss for each of the frequency partitions. The path loss weight may be transmitted from a base station (BS). The path loss weight may be transmitted from the base station by using a superframe header or a broadcast channel. The path loss weight may be obtained on the basis of a path loss ratio which is a ratio of a path loss of a neighbor cell adjacent to a serving cell to a path loss of the serving cell to which the mobile station belongs. The path loss ratio may be estimated by the MS. Each of the plurality of frequency partitions may be used for the purpose of fractional frequency reuse (FFR). The method may further include allocating one frequency partition among the plurality of frequency partitions, and transmitting an uplink signal by using the allocated one frequency partition with the transmit power determined for the one frequency partition.

In another aspect, a method for uplink power control performed by a base station in a wireless communication system is provided. The method include receiving fractional frequency reuse (FFR) information from a neighbor base station BS, and controlling uplink power on the basis of the FFR information. The FFR information may include a base station identifier (ID) for identifying the neighbor BS and an interference level for each of a plurality of frequency partitions. The FFR information may include a base station ID for identifying the neighbor BS and an interference level for each of a plurality of frequency partitions for each of a plurality of carriers.

In another aspect, a mobile station is provided. The mobile station include a radio frequency (RF) unit for transmitting/receiving a radio signal, and a processor coupled to the RF unit and configured for dividing a frequency band for uplink transmission into a plurality of frequency partitions, obtaining a path loss weight for each of the plurality of frequency partitions, and determining transmit power for each of the frequency partitions on the basis of the path loss weight.

Advantageous Effects

The present invention provides a method and apparatus for controlling uplink power in a wireless communication system. Therefore, overall system performance can be improved.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier-frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet radio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. IEEE 802.16m is an evolution of IEEE 802.16e.

Although the following description will focus on the IEEE 802.16m for clarity of explanation, the technical features of the present invention are not limited thereto.

Figure 1:
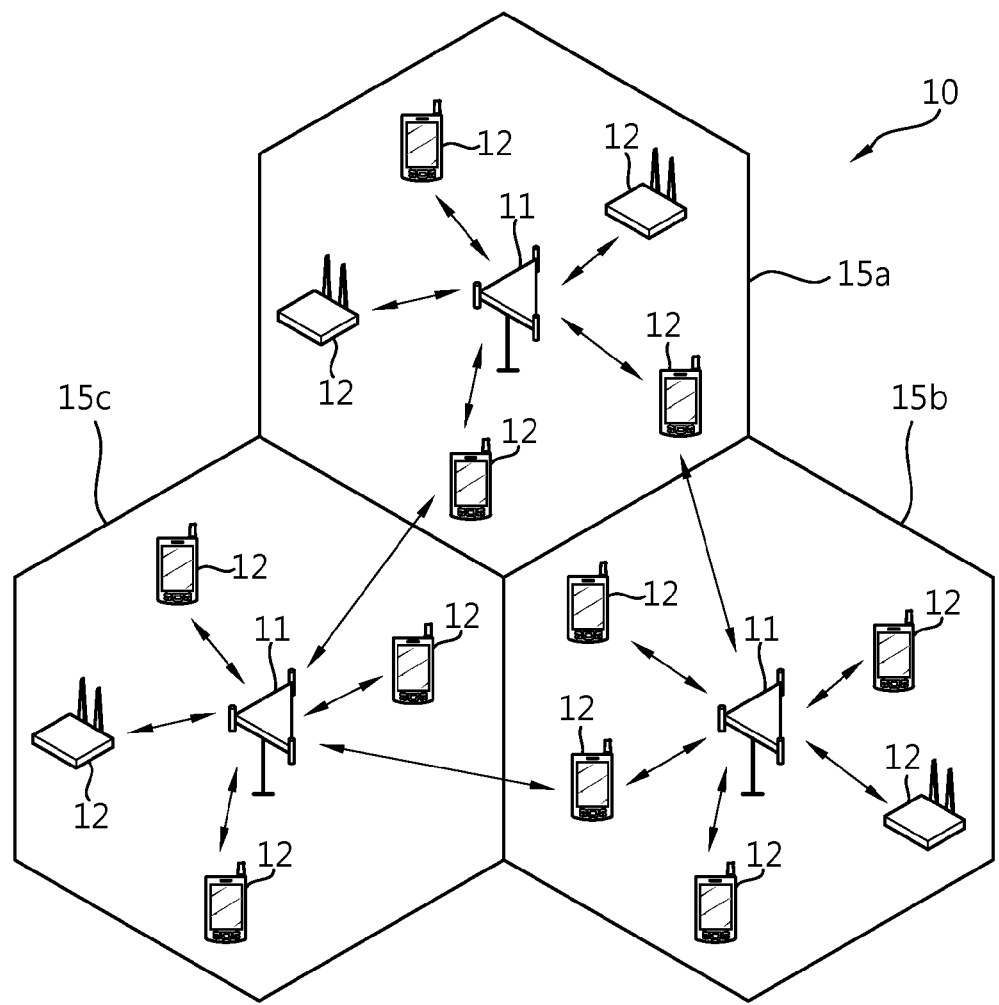
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc.

An MS belongs to one cell. A cell to which the MS belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the MS.

If an uplink signal received by the serving BS from a first MS belonging to the serving cell is a data signal, an uplink signal received by the serving BS from a second MS belonging to the neighbor cell acts as interference to the data signal. From the perspective of the neighbor BS, the uplink signal received from the second MS is the data signal, and the uplink signal received from the first MS acts as the interference.

When the MS moves its position from the serving cell to the neighbor cell, the neighbor cell to which the MS moves has to be changed to the serving cell in order to provide a seamless service to the MS. As such, a procedure of changing the serving cell of the MS due to the movement of the MS is referred to as a handover.

Hereinafter, a downlink (DL) denotes a communication link from the BS to the MS, and an uplink (UL) denotes a communication link from the MS to the BS. In the DL, a transmitter may be a part of the BS, and a receiver may be a part of the MS. In the UL, the transmitter may be a part of the MS, and the receiver may be a part of the BS.

As a duplex scheme, the wireless communication system can use a time division duplex (TDD) scheme, a frequency division duplex (FDD) scheme, or a half-duplex FDD (H-FDD) scheme.

Figure 2:
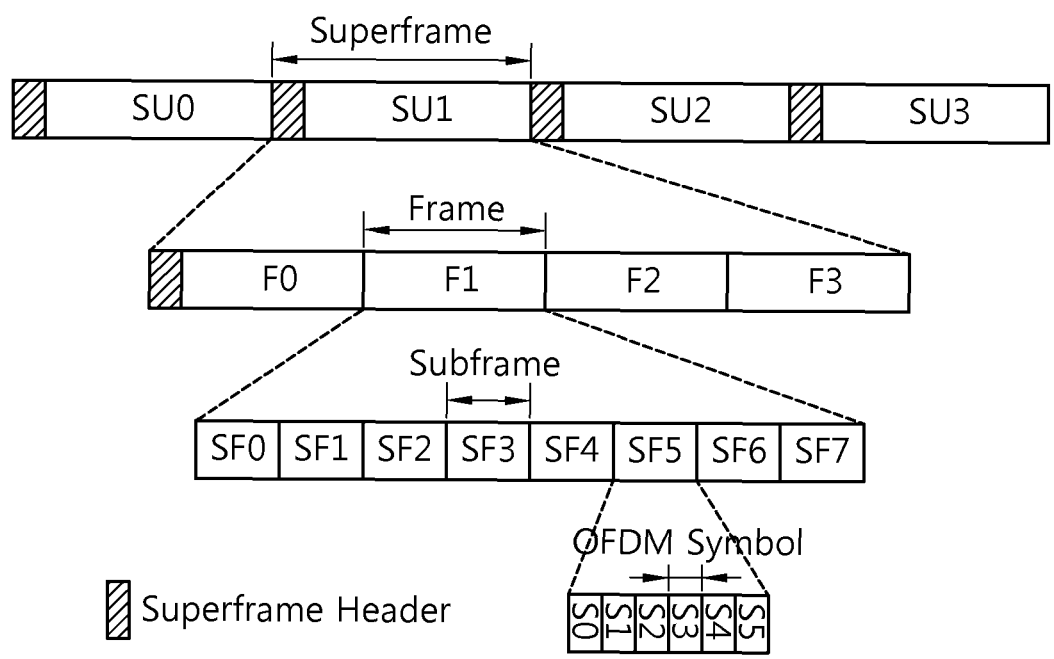
FIG. 2 shows an example of a superframe structure in an IEEE 802.16m system.

FIG. 2 shows an example of a superframe structure in an IEEE 802.16m system.

Referring to FIG. 2, each of superframes SU0, SU1, SU2, and SU3 includes a superframe header (SFH) and four frames F0, F1, F2, and F3. Each frame may have the same length in the superframe. For example, the superframe may have a length of 20 milliseconds (ms), and each frame may have a length of 5 ms. One frame includes 8 subframes SF0, SF1, . . . , SF7. Each subframe can be allocated for DL transmission or UL transmission.

The SFH carries an essential system parameter and system configuration information. The SFH may be located in a first subframe of the superframe. The SFH can be classified into a primary-SFH (P-SFH) and a secondary-SFH (S-SFH). The P-SFH is transmitted in every superframe. The S-SFH may be transmitted in every superframe.

The superframe structure is for exemplary purposes only. A length of the superframe, the number of frames included in the superframe, the number of subframes included in the frame, etc., may change variously. The number of subframes included in the frame may change variously according to a channel bandwidth and a cyclic prefix (CP) length.

One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. Although it is described herein that one subframe includes 6 OFDM symbols S0, S1, . . . , S5, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. For example, the number of subcarriers may be 18 in the PRU. The number of OFDM symbols included in the PRU is equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A fractional frequency reuse (FFR) scheme can be used in a cellular system having multiple cells. The FFR scheme divides a full frequency band into a plurality of frequency partitions (FPs), and allocates the FPs to respective cells. According to the FFR scheme, different FPs can be allocated between neighbor cells, and the same FP can be allocated between cells spaced apart from each another. Therefore, inter-cell interference (ICI) can be reduced, and performance of an MS located in a cell edge can be increased.

Figure 3:
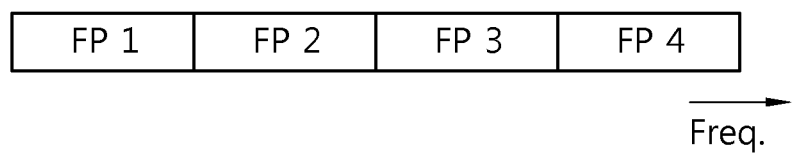
FIG. 3 shows an example of a method of dividing a full frequency band into a plurality of FPs.

FIG. 3 shows an example of a method of dividing a full frequency band into a plurality of FPs.

Referring to FIG. 3, the full frequency band is divided into a first FP (i.e., FP1), a second FP (i.e., FP2), a third FP (i.e., FP3), and a fourth FP (i.e., FP4). Each FP can be physically or logically divided from the full frequency band.

Figure 4:
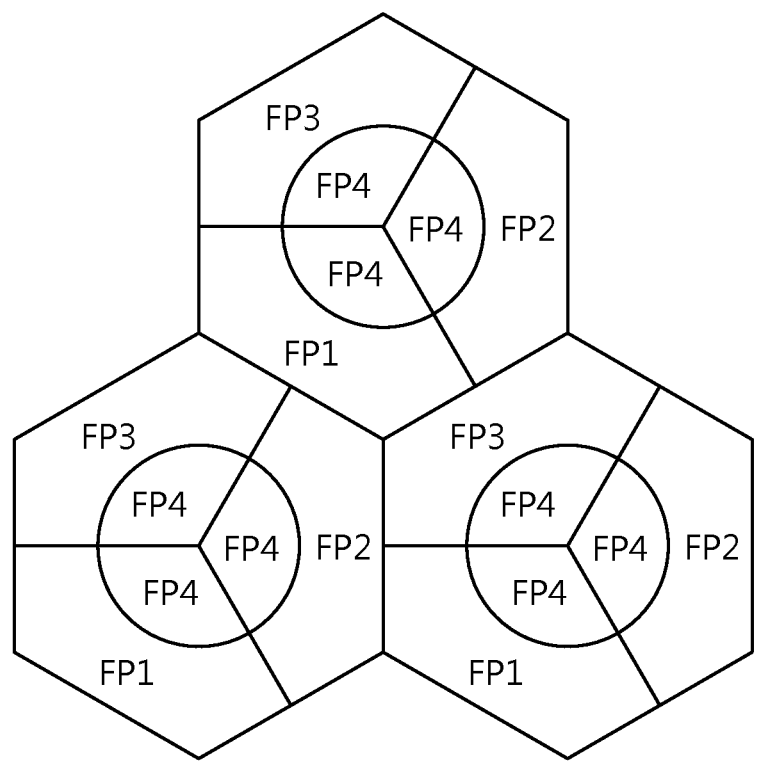
FIG. 4 shows an example of a cellular system using an FFR scheme.

FIG. 4 shows an example of a cellular system using an FFR scheme.

Referring to FIG. 4, each cell is divided into an inner cell and a cell edge. Further, each cell is divided into three sectors. It is assumed that a full frequency band is divided into three FPs (i.e., FP1, FP2, and FP3). A fourth FP (i.e., FP4) is a combination of the first FP (i.e., FP1), the second PF (i.e., FP2), and the third FP (i.e., FP3). That is, the FP4 is identical to the full frequency band.

The FP4 is allocated in the inner cell. Any one of the FP1, the FP2, and the FP3 is allocated in each sector of the cell edge. In this case, different FPs are allocated between neighbor cells. Hereinafter, an allocated FP is referred to as an active FP, and an unallocated FP is referred to as an inactive FP. For example, when the FP1 is allocated, the FP1 is an active FP, and the FP2 and the FP3 are inactive FPs.

A frequency reuse factor (FRF) can be defined as the number of cells (or sectors) into which the full frequency band can be divided. In this case, the FRF may be 1 in the inner cell, and may be 3 in each sector of the cell edge.

Figure 5:
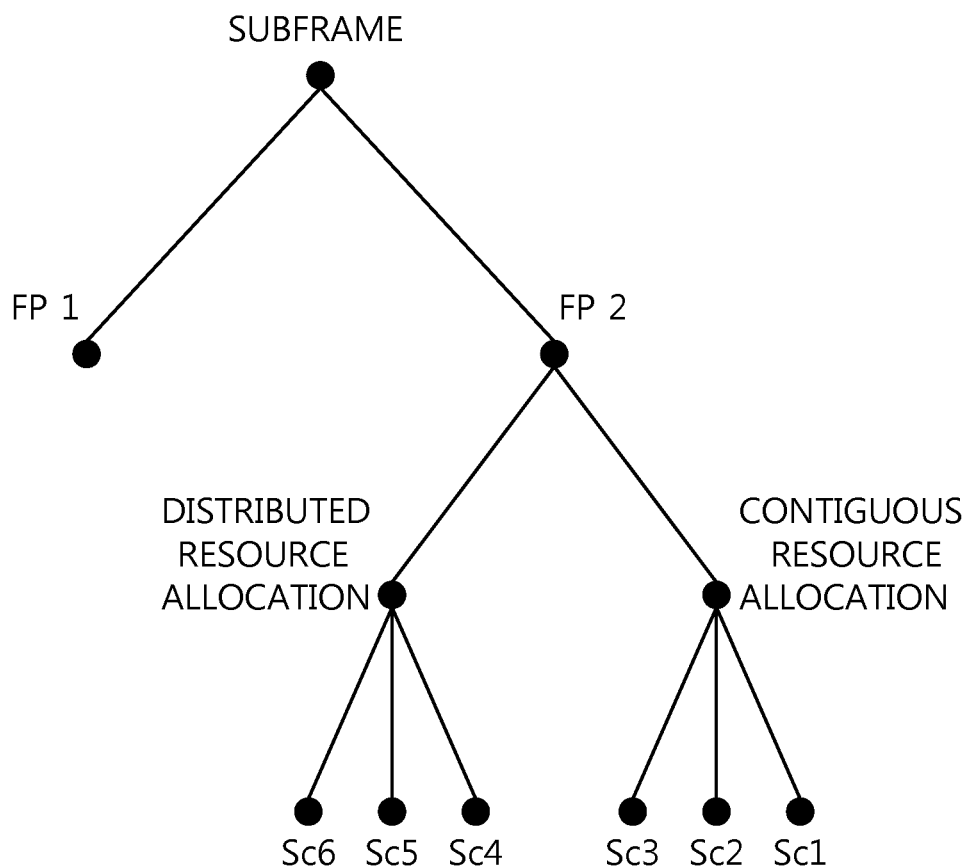
FIG. 5 shows an example of a physical structure of an uplink subframe in an IEEE 802.16m system.

FIG. 5 shows an example of a physical structure of an uplink subframe in an IEEE 802.16m system.

Referring to FIG. 5, an uplink subframe can be divided into at least one frequency partition (FP). Herein, the subframe is divided into two FPs (i.e., FP1 and FP2) for example. However, the number of FPs included in the subframe is not limited thereto. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier. A logical resource unit (LRU) is a basic logical unit for the distributed resource allocation and the contiguous resource allocation.

A distributed (non-contiguous) resource unit (DRU) includes a subcarrier group spread across distributed resource allocation in one FP. A size of the DRU is the same as a size of a PRU. A contiguous (localized) resource unit (CRU) includes a subcarrier group contiguous across resource allocation in one FP. A size of the CRU is the same as the size of the PRU.

Figure 6:
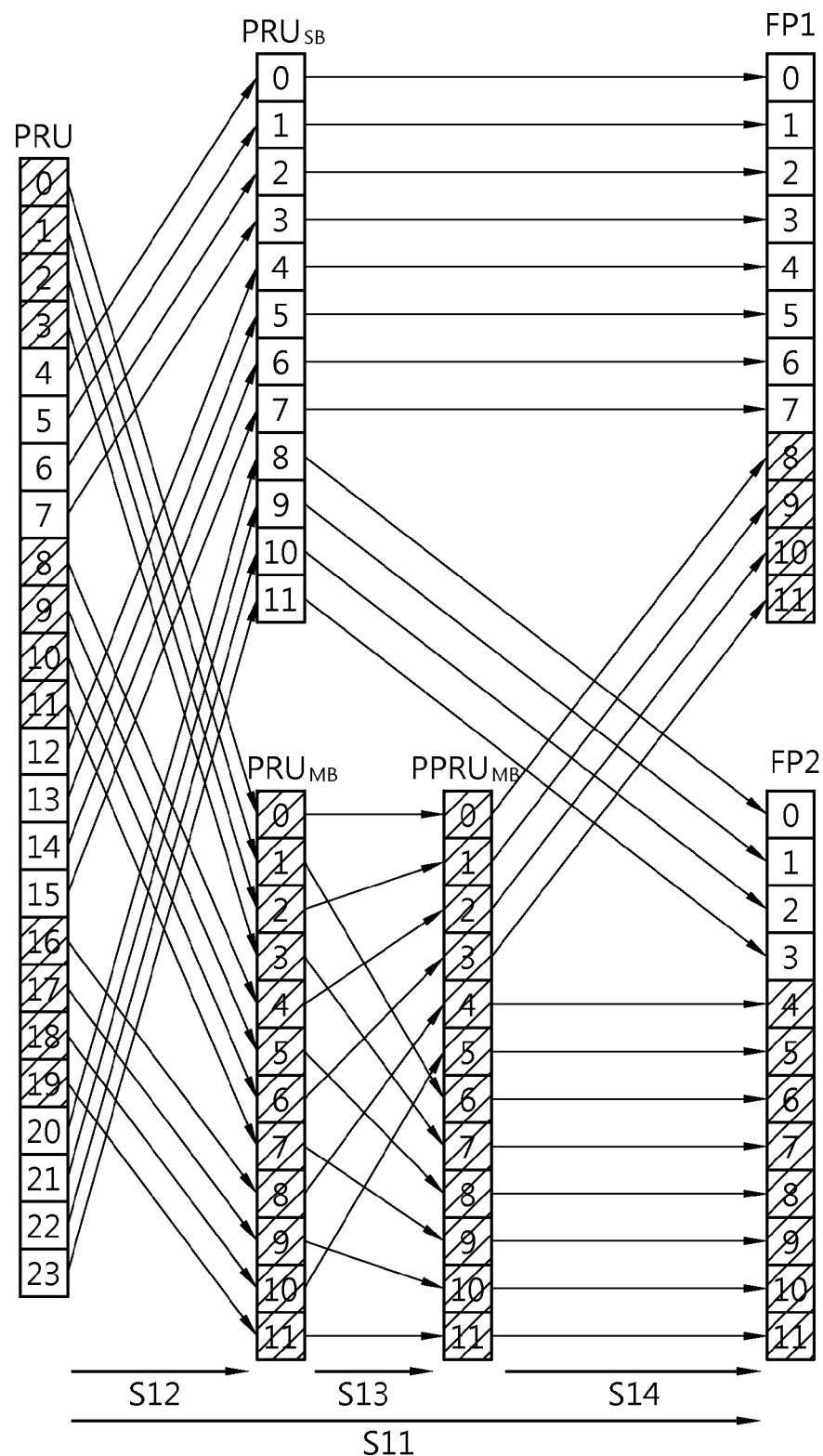
FIG. 6 shows an example of a method of mapping between a PRU and an FP.

FIG. 6 shows an example of a method of mapping between a PRU and an FP.

Referring to FIG. 6, a subframe includes 24 PRUs in a frequency domain. The 24 PRUs are divided into two FPs, i.e., FP1 and FP 2 (step S11). The PRUs are divided into subbands and minibands according to a predetermined resource mapping rule (step S12). A subband is a granularity of contiguous PRUs in the frequency domain or a basic unit for constituting a CRU. A size of the subband in the frequency domain may be 4 PRUs. A miniband is a granularity of a distributed PRU or a unit for constituting a DRU. A size of the miniband in the frequency domain may be one PRU or an integer multiple of the PRU. A PRU may be allocated to a subband and a miniband by being selected in a granularity of 4 PRUs, i.e., the size of the subband. A PRU belonging to the subband is referred to as a $PRU_{SB}$, and a PRU belonging to the miniband is referred to as a $PRU_{MB}$. The total number of PRUs is equal to a sum of the number of $PRU_{SB}$s and the number of $PRU_{MB}$s. The $PRU_{SB}$ of the subband and the $PRU_{MB}$ of the miniband are reordered. The $PRU_{SB}$ of the subband is numbered from 0 to (the number of $PRU_{sB}$s−1). The $PRU_{MB}$ of the miniband is numbered from 0 to (the number of $PRU_{MB}$s−1).

The $PRU_{MB}$ of the miniband is subjected to miniband permutation so that it can be permutated in the frequency domain in order to guarantee frequency diversity in each FP (step S13). That is, the numbered $PRU_{MB}$ is permutated according to a predetermined permutation (or mapping) rule and thus becomes a permutated $PRU_{MB}$ ($PPRU_{MB}$).

Some PRUs of the $PRU_{SB}$ of the subband and some PRUs of the $PRU_{MB}$ of the miniband are mapped to a first FP, i.e., FP1. The remaining PRUs of the $PRU_{SB}$ of the subband and the remaining PRUs of the $PRU_{MB}$ of the miniband other than the PRUs mapped to the FP1 are mapped to a second FP, i.e., FP2 (step S14). Thereafter, CRU/DRU allocation is performed for each FP.

The FFR scheme can be applied both to a single-carrier mode operation and a multi-carrier mode operation. The multi-carrier mode operation supports signal transmission through multiple carriers on the basis of a spectrum aggregation technique. In the spectrum aggregation technique, a plurality of non-contiguous frequency bands are physically aggregated in a frequency domain to have the same effect as if a frequency band of a great bandwidth is used logically.

Figure 7:
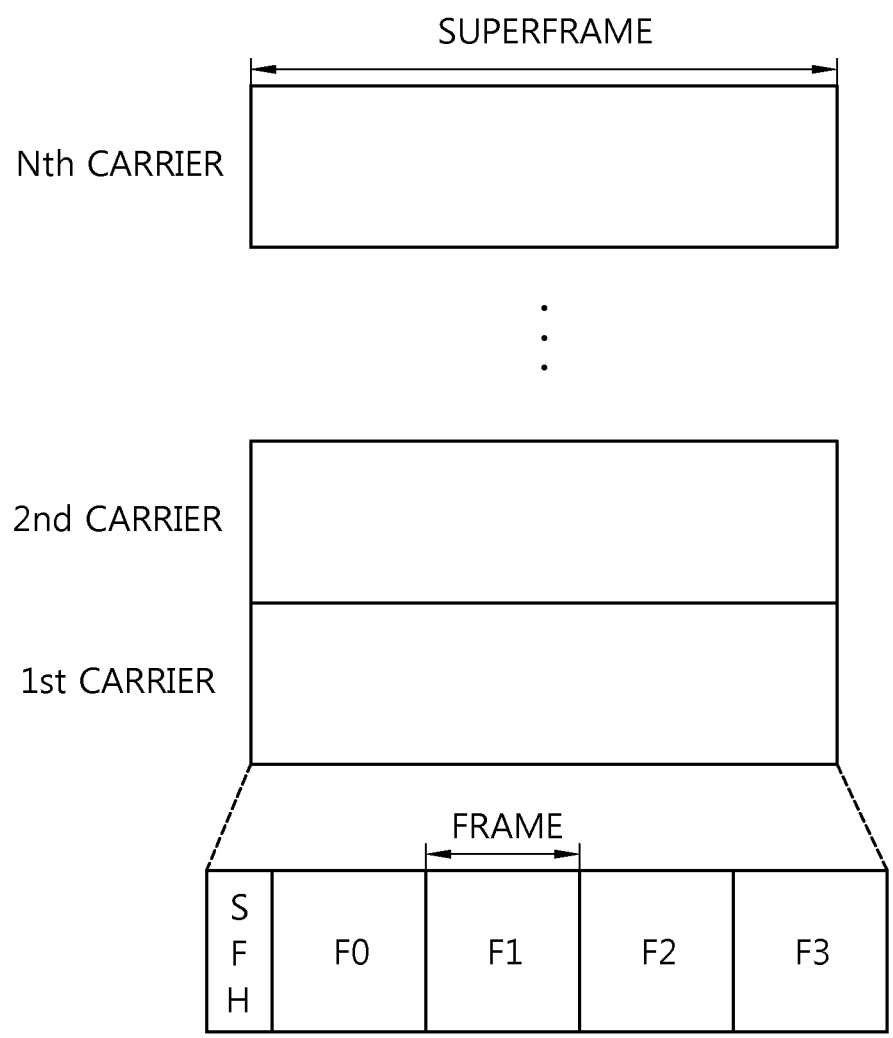
FIG. 7 shows an example of a frame structure for supporting a multi-carrier operation.

FIG. 7 shows an example of a frame structure for supporting a multi-carrier operation.

Referring to FIG. 7, the frame structure is used for each carrier. FIG. 2 may also be used by reference to explain the frame structure for each carrier. Each carrier may have its own superframe header. A subframe of each carrier may be divided into at least one frequency partition (FP). The description on the FP explained up to now may apply for each carrier. Therefore, the number of FPs, a size of each FP, etc., may differ from one carrier to another.

Hereinafter, an uplink FFR scheme will be described in detail.

The FFR scheme may be classified into a hard FFR mode and a soft FFR mode. In the hard FFR mode, an inactive FP is not used. In the soft FFR mode, the inactive FP is used. When operating in the soft FFR mode, resources can be more frequently utilized in comparison with the hard FFR mode.

Figure 8:
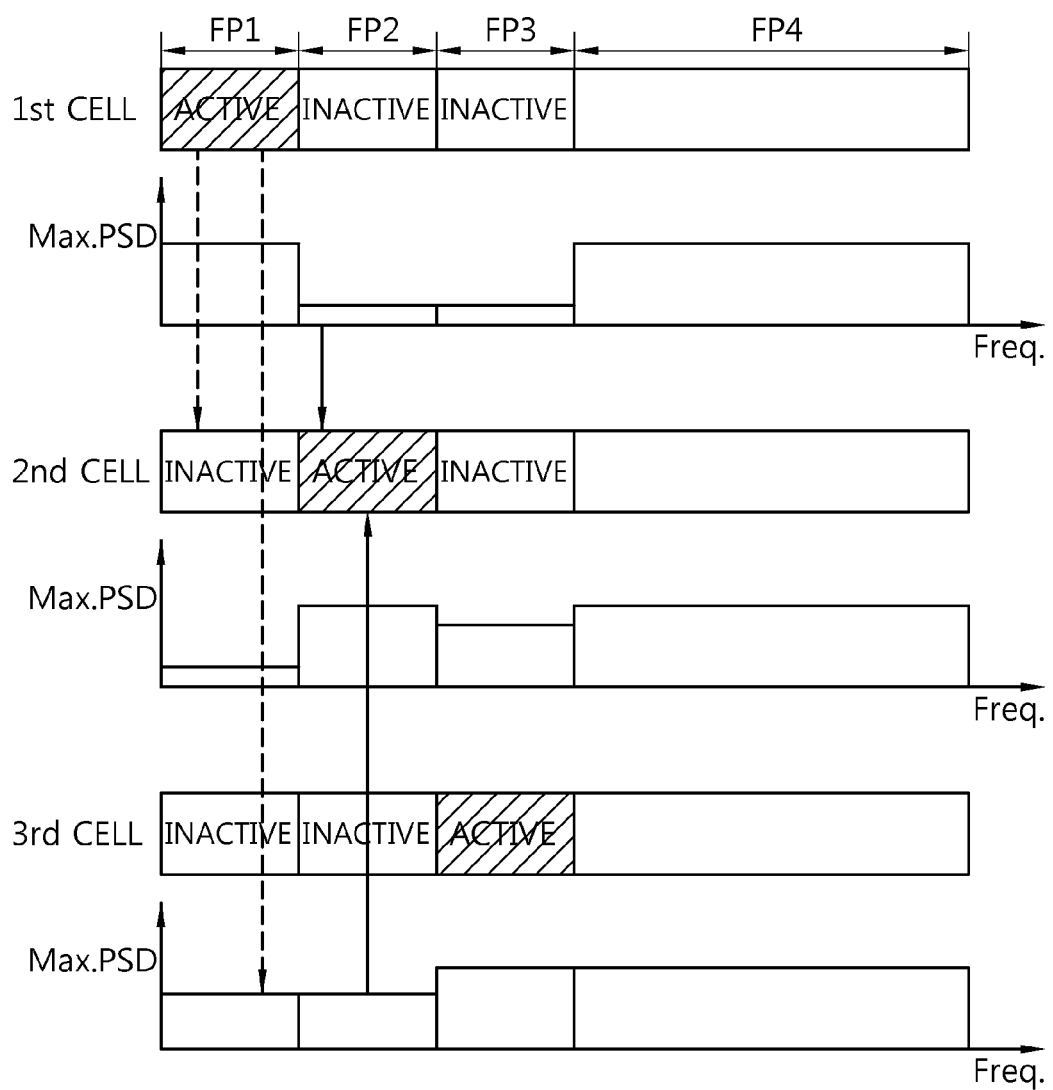
FIG. 8 shows an example of using a soft FFR mode.

FIG. 8 shows an example of using a soft FFR mode.

Referring to FIG. 8, it is assumed that a full frequency band is divided into three FPs (i.e., FP1, FP2, and FP3). A fourth FP (i.e., FP4) is a combination of the first FP (i.e., FP1), the second PF (i.e., FP2), and the third FP (i.e., FP3). That is, the fourth FP (i.e., FP4) is identical to the full frequency band.

An active FP of a first cell is the FP1. An active FP of a second cell is the FP2. An active FP of a third cell is the FP3.

In each cell, the FP4 is generally allocated to an MS located in a cell having a relatively good channel condition. A frequency reuse factor (FRF) in the cell is 1. In each cell, the active FP is allocated to an MS located in a cell edge and experiencing the strongest inter-cell interference (ICI). The FRF in the cell edge is 3.

In each cell, a maximum power spectral density (PSD) level can be defined for each FP. Since it is the soft FFR mode, the maximum PSD level of the inactive FP is not 0. In case of the hard FFR mode, the maximum PSD level of the inactive FP is 0.

The active FP of the first cell, i.e., FP1, may cause interference to the inactive FP of the second cell and the third cell, i.e., FP1 (indicated by a dotted line). In addition, the inactive FP of the first cell and the third cell, i.e., FP2, may cause interference to the active FP of the second cell, i.e., FP2 (indicated by a solid line). In other words, an MS to which the inactive FP of the first cell is allocated may act as an interference source to the active FP of the second cell. As such, if the inactive FP cannot be effectively used in the soft FFR mode, performance of the FFR scheme may deteriorate. When the BS selects an MS which will use the inactive FP, the BS has to select the MS carefully on the basis of a state of the MS. Therefore, there is a need to provide a method of allocating an inactive FP to minimize ICI.

The method of allocating the inactive FP may be triggered by either the MS or the BS.

Figure 9:
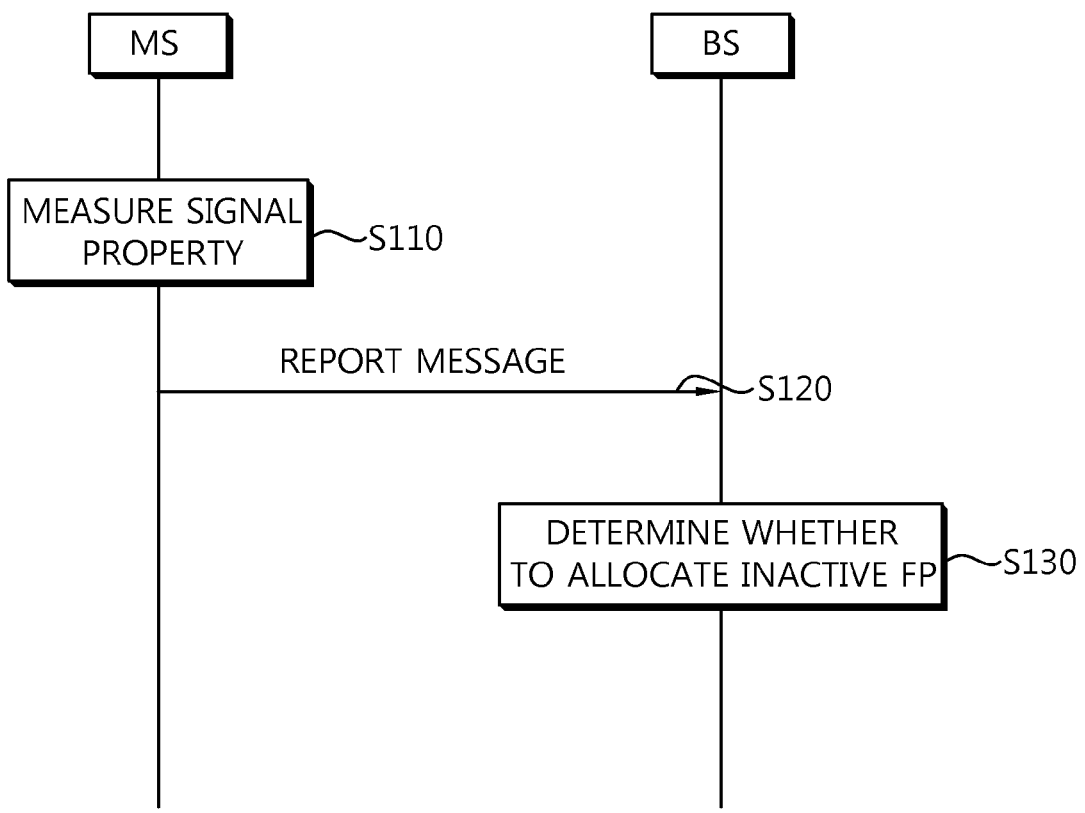
FIG. 9 is a flowchart showing an example of an inactive FP allocation method triggered by an MS.

FIG. 9 is a flowchart showing an example of an inactive FP allocation method triggered by an MS.

Referring to FIG. 9, the MS measures a signal property (step S110). The MS transmits a report message to a BS on the basis of the measured signal property (step S120). The BS determines whether to allocate the inactive FP to the MS on the basis of the report message (step S130).

The signal property measured by the MS is a signal property of a serving cell and/or a signal property of a neighbor cell. The MS may determine a handover by considering the signal property of the serving cell and the signal property of the neighbor cell. The MS may measure the signal property either periodically or non-periodically.

The signal property may be measured in various forms, such as a path loss (PL), a received signal strength indication (RSSI), channel quality information (CQI), etc. A downlink signal used for measurement of the signal property may be a reference signal known to both the BS and the MS. The reference signal is also referred to as a pilot.

A case where the signal property is the PL will be described for example. The PL may be defined as a difference between transmit (Tx) power and receive (Rx) power of the downlink signal. The PL in a unit of decibel (dB) can be expressed by the following equation.

$$PL = 10 \log_{10}\left(\frac{Pt}{Pr}\right) [dB] \qquad \text{[Equation 1]}$$

Herein, Pt denotes Tx power of a downlink signal, and Pr denotes Rx power of the downlink signal.

In general, the Rx power Pr and the Tx power Pt of the downlink signal are related by the following equation.

$$Pr \propto Pt \cdot d^{-n} \qquad \text{[Equation 2]}$$

Herein, d denotes a distance between the BS and the MS, and n denotes a path loss exponent.

Now, the report message will be described. The report message may be transmitted either periodically or non-periodically.

For example, the report message may include an MS identifier (ID) and a state field. The MS ID is used to identify the MS to which the report message is transmitted by the BS. The state field indicates a state of the MS on the basis of the signal property measured by the MS. The MS may determine the state of the MS by comparing the signal property with a threshold. For example, if the signal property is greater than the threshold, the MS may determine that the MS is located in an inner cell, and if the signal property is less than the threshold, the MS may determine that the MS is located in a cell edge. In this case, the state of the MS may be subdivided by using a multi-level threshold. If the MS is geographically located near a serving BS, the signal property of the neighbor cell may not be able to be measured. In this case, a value of the state field may be a default value.

For another example, the report message may include the MS ID and a request indicator. The request indicator indicates whether the MS will request the BS to allocate an inactive FP. A size of the request indicator may be one bit. If the channel state of the MS is determined to be good on the basis of the measured signal property, the MS may request the allocation of the inactive FP by using the request indicator. In this case, the report message may further include a state field.

The report message may be transmitted as an independent uplink message or may be transmitted together with another uplink message. For example, when the MS transmits a bandwidth request to request an uplink bandwidth, the report message may be transmitted in a format in which a field for configuring the report message is added to the bandwidth request.

On the basis of the report message, the BS determines whether to allocate the inactive FP to the MS. If it is determined that the channel state of the MS is good on the basis of the report message, the BS may allocate the inactive FP to the MS. Alternatively, if a value of the state field included in the report message is a default value or if the MS requests the allocation of the inactive FP through the report message, the BS may allocate the inactive FP to the MS.

The inactive FP allocation method of FIG. 9 can be applied irrespective of a duplex scheme. If TDD is used as the duplex scheme, an uplink channel property and a downlink channel property are almost reciprocal, that is, have channel reciprocity. Therefore, the MS can predict the uplink channel property by using the downlink signal property. If the downlink signal property is good, the inactive FP may be allocated to the MS for uplink transmission. When FDD is used as the duplex scheme, the downlink channel property and the uplink channel property may not coincide with each other. However, a distance between the BS and the MS may be estimated by using the downlink signal property. If it is determined that the distance between the BS and the MS is short, the inactive FP may be allocated to the MS for uplink transmission.

As such, by carefully selecting the MS which will use the inactive FP on the basis of the state of the MS, the soft FFR mode can be effectively operated, and ICI can be minimized.

In case of a system in which the BS exactly knows a geographical distance to MSs similarly to location based services (LBS), the BS may allocate an inactive FP to an MS close in distance to the BS upon receiving a report indicating a location of the MS.

Figure 10:
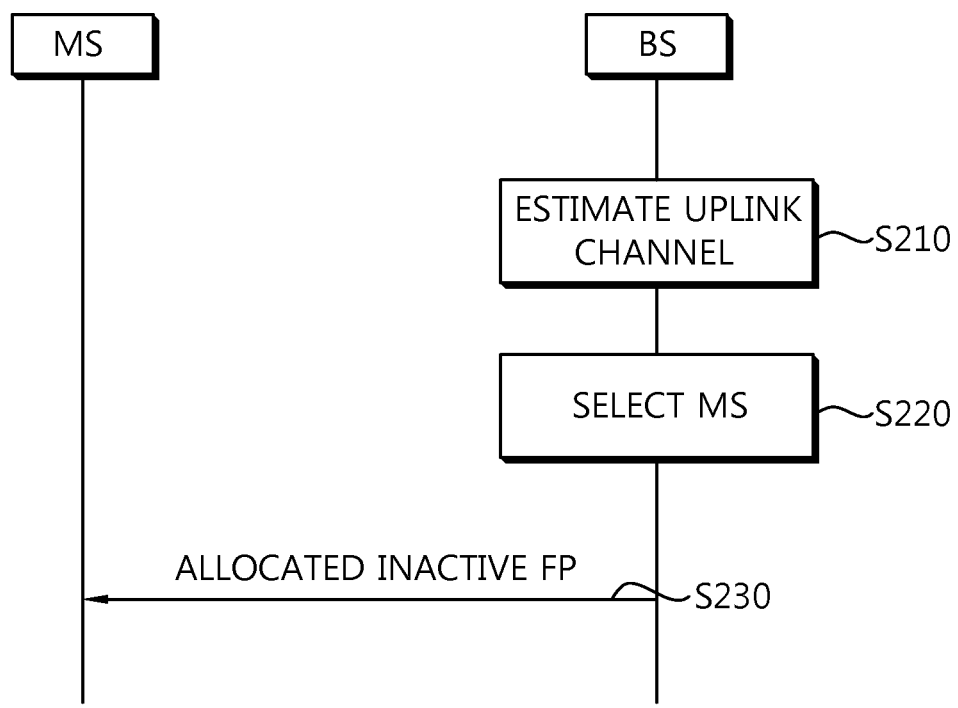
FIG. 10 is a flowchart showing an example of an inactive FP allocation method triggered by a BS.

FIG. 10 is a flowchart showing an example of an inactive FP allocation method triggered by a BS.

Referring to FIG. 10, the BS estimates an uplink channel of each MS located in an inner cell (step S210). On the basis of the estimated uplink channel, the BS selects an MS to which the inactive FP will be allocated (step S220). The BS allocates the inactive FP to the MS (step S230).

The BS may estimate the uplink channel of the MS by using a sounding reference signal (SRS). The SRS is a reference signal transmitted by the MS to the BS for uplink scheduling. The BS estimates the uplink channel by using the received SRS, and uses the estimated uplink channel in the uplink scheduling. Alternatively, the BS may estimate the uplink channel on the basis of an acknowledgement (ACK)/negative-acknowledgement (NACK) ratio for uplink data.

The BS may directly determine a state of the MS by comparing the estimated uplink channel with a threshold. For example, by comparing the estimated uplink channel with a first threshold, MSs are classified into inner-cell MSs and cell-edge MSs. Next, by applying a second threshold, the inner-cell MSs may be classified into two groups. The inactive FP may be allocated to an MS group having a best channel condition.

Figure 11:
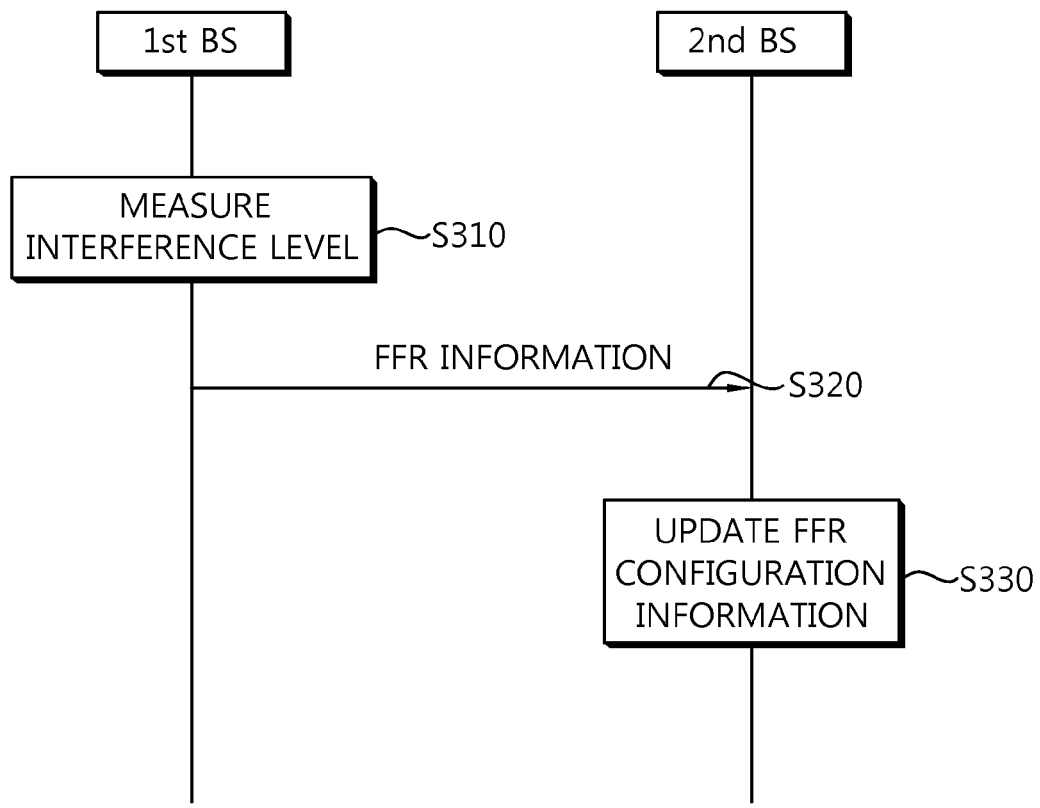
FIG. 11 is a flowchart showing a method of sharing FFR information between BSs.

FIG. 11 is a flowchart showing a method of sharing FFR information between BSs.

Referring to FIG. 11, a first BS measures an interference level (step S310). The first BS transmits the FFR information including the interference level to a second BS (step S320). The second BS updates FFR configuration information on the basis of the received FFR information (step S330).

A serving BS may receive an uplink signal transmitted by a second MS belonging to a neighbor cell in addition to an uplink signal transmitted by a first MS belonging to a serving cell. The uplink signal transmitted by the second MS belonging to the neighbor cell acts as interference to the serving BS. The interference level may be measured in various forms, such as noise and interference (NI), interference over thermal noise (IoT), interference plus noise over thermal noise, etc.

The interference level included in the FFR information may be expressed by an absolute value such as a real value or a relative value of another value. If the interference level is expressed by the absolute value, the interference level may be expressed by using one representative value or a multi-level representative value. If the interference level is expressed by the relative value, the interference level may be expressed by a difference to the previously reported interference level. In addition, the interference information may be expressed by a value converted by mapping (e.g., low, medium, high).

In general, the FFR information including the interference level may be shared between BSs through a backbone network. The BSs are connected by the backbone network. In addition to the backbone network, the FFR information may be shared between the BSs by signaling using an air interface. In this case, an MS located in a cell edge may take a role of a relay station for sharing the FFR information between the BSs. The FFR information may be transmitted to a specific neighbor BS or may be broadcast.

The FFR information includes the interference level and a BS ID for identifying the BS that transmits the FFR information. The interference level may be included in the FFR information by being subdivided into an interference level for each FP. In addition, the interference level for each FP may be further subdivided into an interference level for distributed resource allocation and an interference level for contiguous resource allocation.

The more the interference level is subdivided, the higher the overhead of FFR information transmission but the higher the accuracy of the FFR information. The FFR information may further include information indicating the number of FPs, information indicating a size of each FP, information indicating a maximum PSD of each FP, an FFR configuration update period, etc.

In case of an operation of the multi-carrier mode, the FFR information may be further subdivided for each carrier.

The table below shows an example of an FFR information format.

TABLE 1

| Syntax | Size (bits) |
|---|---|
| FFR information( ){ | |
|   BS ID | variable |
|   For(i__c=1; i__c <= the # of multi-carrier; i__c++){ | variable |
|     The # of frequency partition(FP)s[i__c] | variable |
|     For(i__FP=1; i__FP <= The # of frequency partitions[i__c]; i__FP++){ | |
|       Size of each frequency partition [i__c][i__FP] | variable |
|       Interference level for each frequency partition [i__c][i__FP] | variable |
|       Max.PSD level for each frequency partition [i__c][i__FP] | variable |
|     } | |
|   } | |
|   FFR configuration update period | variable |
| } | |

Referring to the table above, i_c denotes a carrier index, and i_FP denotes a frequency partition index.

Upon receiving the FFR information, the BS may update the FFR configuration information on the basis of the FFR information. Examples of the FFR configuration information include the number of FPs, a size of each FP, a maximum PSD level of each FP, etc. The serving BS may update the maximum PSD level for each FP of the serving cell on the basis of the FFR information of the neighbor cell, or may update the size of each FP. The BS may transmit the FFR configuration information to the MS by using a superframe header.

The BS may periodically transmit the FFR information. Alternatively, the BS may transmit the FFR information in an event-triggered manner such that the information is transmitted when a specific condition is satisfied. For example, if the interference level measured in a specific FP by the first BS is greater than a predetermined threshold, the first BS may transmit the FFR information to the second BS. The second BS may update the maximum PSD of the specific FP. That is, uplink power control can be performed by sharing the FFR information between the BSs.

In this case, the threshold compared with the interference level may be set identically in a cell or may be set differently for each FP.

As such, by sharing the FFR information between the BSs, the FFR scheme can be effectively supported in the cellular system. Irrespective of the hard FFR mode or the soft FFR mode, the FFR mode can be shared between the BSs.

The BS controls uplink power. When using the FFR scheme, the maximum PSD level may be set differently for each FP. In this case, it is effective for the BS to control uplink power for each FP. Therefore, there is a need for a method of controlling the uplink power for each FP.

Figure 12:
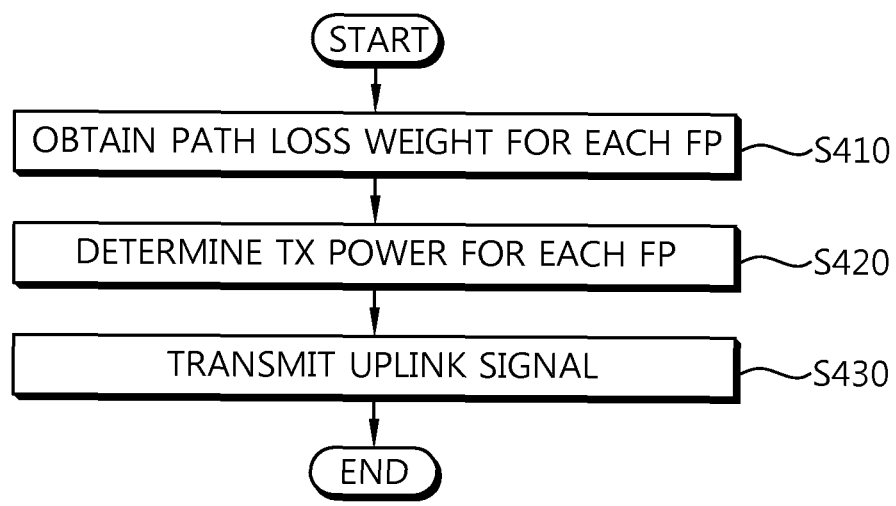
FIG. 12 is a flowchart showing an uplink power control method performed by an MS according to an embodiment of the present invention.

FIG. 12 is a flowchart showing an uplink power control method performed by an MS according to an embodiment of the present invention.

Referring to FIG. 12, the MS obtains a path loss weight for each FP (step S410). The MS determines Tx power for each FP on the basis of the path loss weight (step S420). The MS transmits an uplink signal according to the determined Tx power (step S430).

Such an uplink power control method is open loop power control (OLPC). The OLPC is a method in which the MS directly determines the uplink power on the basis of several parameters without having to receive a direct UP/DOWN command from the BS. In comparison thereto, closed loop power control (CLPC) is a method in which the MS increases or decreases the uplink power according to the direct UP/DOWN command received from the BS.

The uplink power P may be determined by the following equation. A unit of the uplink power P may be dBm per subcarrier, subband, or subchannel.

$$P = a \cdot PL + \text{other parameters} \quad [\text{Equation 3}]$$

Herein, 'a' denotes a path loss weight, and PL denotes a path loss (where $0 < a \leq 1$). The path loss is measured by the MS. Example of other parameters for determining the uplink power include an average power level of a noise and interference (NI) estimated by the BS, a target uplink signal to interference plus noise ratio (SINR) received from the BS, a downlink SINR (or signal to noise ratio (SNR)), an MS-specific power offset correction term controlled by the MS, an MS-specific power offset correction term controlled by the BS. Values of other parameters may be determined by the MS or may be instructed by the BS to the MS.

Hereinafter, a method of obtaining a path loss weight for each FP of an MS will be described.

First, the MS may directly determine the path loss weight for each FP on the basis of a pass loss ratio or the like. The path loss ratio denotes a ratio of a path loss of a neighbor cell to a path loss of a serving cell. The MS may obtain the path loss ratio by estimating each of the path loss of the serving cell and the path loss of the neighbor cell. The path loss ratio may differ for each FP. Therefore, the path loss weight may also differ for each FP.

If the path loss ratio is small, it implies that the neighbor cell is not much influential as an interference source. In this case, a great value may be used as the path loss weight to increase the uplink power. If the path loss ratio is great, it implies that the neighbor cell is much influential as the interference source. In this case, a small value may be used as the path loss weight to decrease the uplink power.

Figure 13:
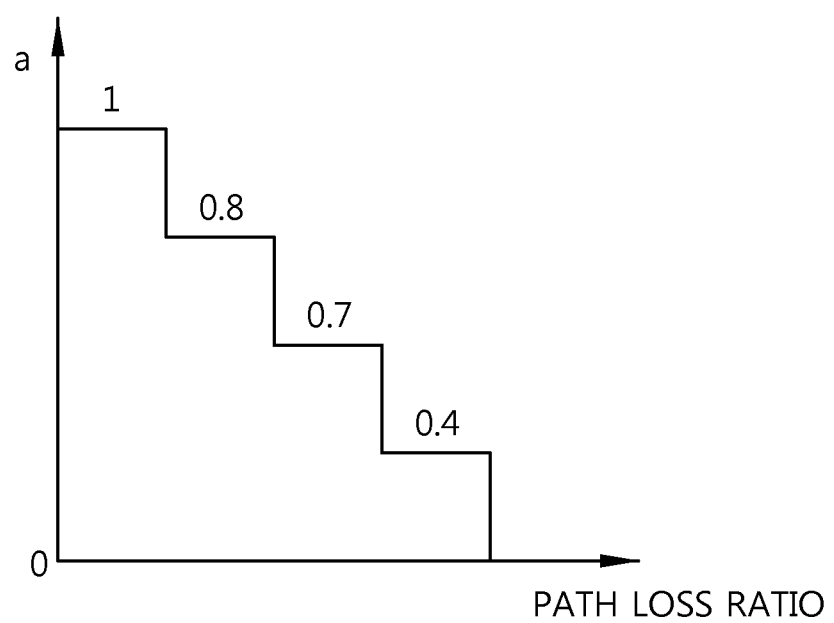
FIG. 13 is a graph showing an example of a method of determining a path loss weight on the basis of a path loss ratio.

FIG. 13 is a graph showing an example of a method of determining a path loss weight on the basis of a path loss ratio.

Referring to FIG. 13, the path loss ratio is determined in multiple levels, and a path loss weight 'a' differs for each level. If the path loss ratio is great, the path loss weight decreases, and if the path loss ratio is small, the path loss weight increases.

In addition to the path loss ratio, an MS may determine the path loss weight for each FP on the basis of a signal property of a neighbor cell with respect to a signal property of a serving cell for each FP. For example, the MS may determine the path loss weight for each FP by using relative Rx signal strength or the like between the serving cell and the neighbor cell for each FP.

Secondly, the BS may transmit path loss weight information for each FP to the MS, and the MS may determine the path loss weight for each FP on the basis of the path loss weight information. The path loss weight information may be transmitted as common control information through a broadcast channel. For example, the path loss weight information may be broadcast by using a superframe header or a broadcast channel.

The BS may transmit all of path loss weight information for each FP. Alternatively, the BS may transmit the path loss weight information in a format of an index selected from a predetermined lookup table. The lookup table consists of a plurality of indices, and each index corresponds to a path loss weight set. Each of path loss weights belonging to the path loss weight set corresponds to a path loss weight for each FP.

For another example, the BS may transmit maximum path loss weight information, minimum path loss weight information, and additional index information as the loss weight information. The MS may determine the path loss weight according to each FP by using the loss weight information.

Thirdly, a path loss weight fixed for each FP may be used. In an active FP and an FP having a frequency reuse factor (FRF) of 1, a value equal to 1 may be used as the path loss weight. In an inactive FP, a value less than 1 may be used as the path loss weight. If a plurality of inactive FPs are provided, a different path loss weight may be used for each inactive FP. In this case, the path loss weight fixed for each FP can vary over time.

As such, by determining the path loss weight for each FP on the basis of the path loss weight, power allocation of the inactive FP of the serving cell is restricted, and thus an interference level for the active FP of the neighbor cell can be decreased. In this manner, the wireless communication system provides the uplink power control method. Therefore, overall system performance can be improved.

Figure 14:
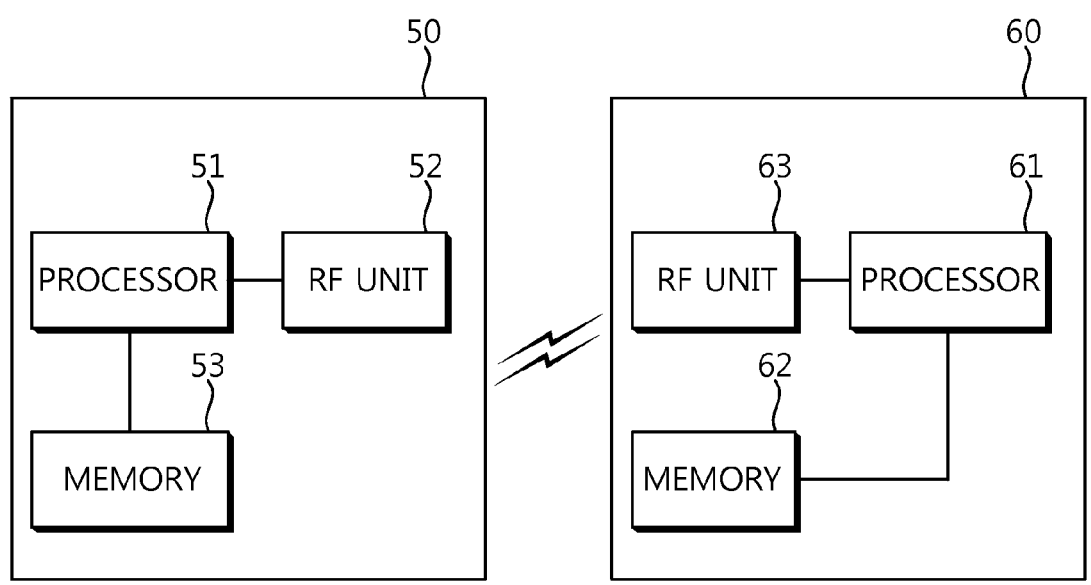
FIG. 14 is a block diagram showing wireless communication system to implement an embodiment of the present invention.

FIG. 14 is a block diagram showing wireless communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for uplink power control performed by a mobile station (MS) in a wireless communication system, the method comprising:
   estimating a path loss of a neighbor cell adjacent to a serving cell and a path loss of the serving cell to which the mobile station belongs for each of a plurality of frequency partitions;
   obtaining a path loss weight for each of the plurality of frequency partitions based on a path loss ratio which is a ratio of the path loss of the neighbor cell to the path loss of the serving cell for each of the plurality of frequency partitions; and
   determining transmit power for each of the frequency partitions on the basis of the path loss weight for each of the plurality of frequency partitions,
   wherein a path loss weight for a frequency partition whose path loss ratio is great is smaller than a path loss weight for a frequency partition whose path loss ratio is small.

2. The method of claim 1, wherein the transmit power is determined further on the basis of the path loss for each of the frequency partitions.

3. The method of claim 1, wherein the path loss ratio for each of the plurality of frequency partitions is determined in multiple levels.

4. The method of claim 1, wherein each of the plurality of frequency partitions is used for the purpose of fractional frequency reuse (FFR).

5. A mobile station comprising:
   a radio frequency (RF) unit for transmitting/receiving a radio signal; and
   a processor coupled to the RF unit and configured for:
   estimating a path loss of a neighbor cell adjacent to a serving cell and a path loss of the serving cell to which the mobile station belongs for each of a plurality of frequency partitions;
   obtaining a path loss weight for each of the plurality of frequency partitions based on a path loss ratio which is a ratio of the path loss of the neighbor cell to the path loss of the serving cell for each of the plurality of frequency partitions; and
   determining transmit power for each of the frequency partitions on the basis of the path loss weight for each of the plurality of frequency partitions,
   wherein a path loss weight for a frequency partition whose path loss ratio is great is smaller than a path loss weight for a frequency partition whose path loss ratio is small.

* * * * *